(14.) FRANK S. ALLEN & CHARLES F. RITCHEL.
Improvement in Bolt and Nut Threading Machines.
No. 121,743. Patented Dec. 12, 1871.
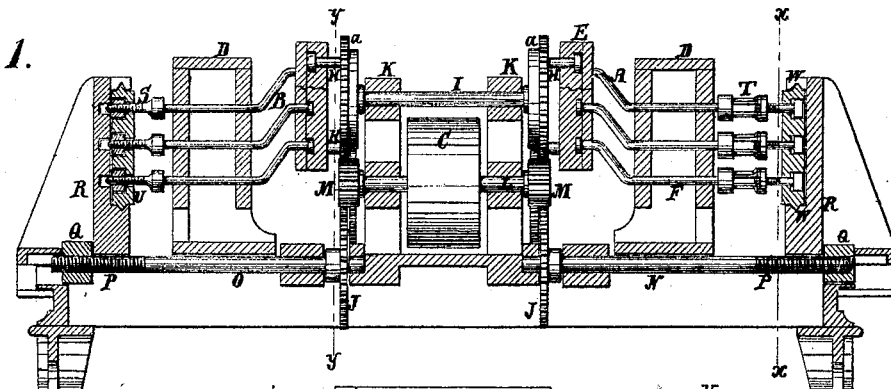
Fig. 1.
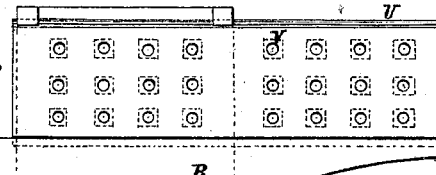
Fig. 2.
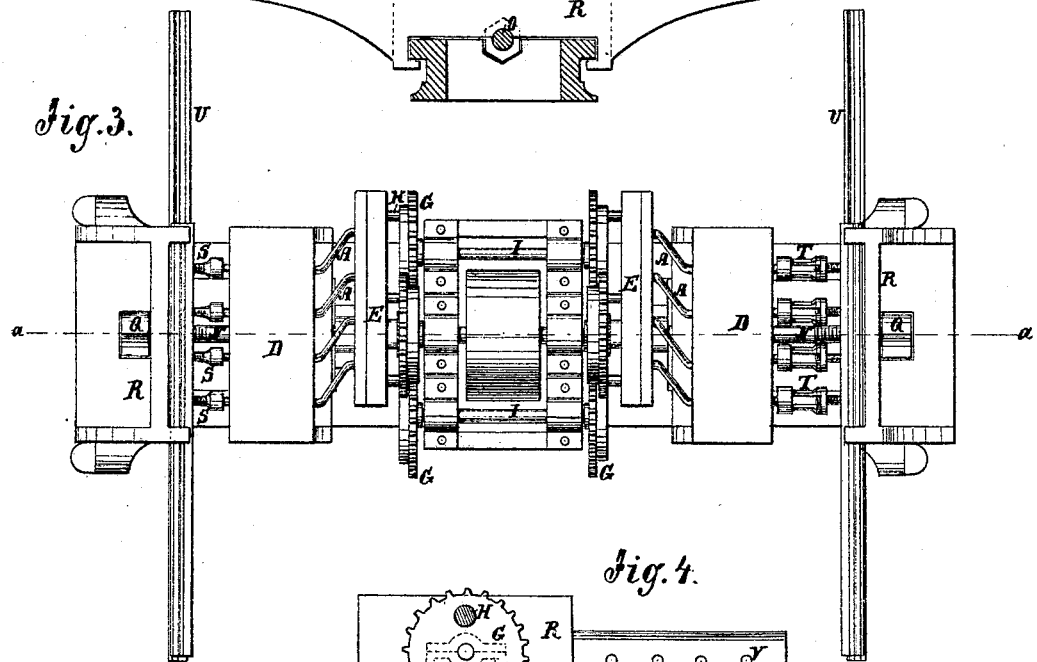
Fig. 3.
Fig. 4.
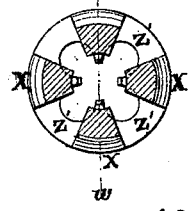
Fig. 5.
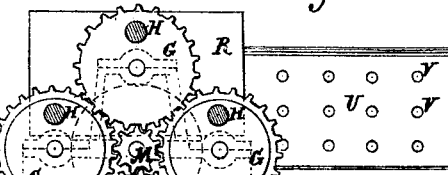
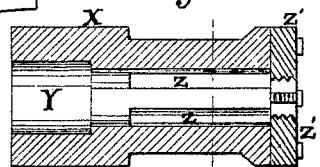
Fig. 6.
Witnesses:
A. Bennerendorf
Francis McArdle
Inventor:
F. S. Allen
Chas. F. Ritchel
per Munn & Co.
Attorneys.
AM. PHOTO-LITHOGRAPHIC CO. N.Y. (OSBORNE'S PROCESS.)

121,743

UNITED STATES PATENT OFFICE.

FRANK S. ALLEN AND CHARLES F. RITCHEL, OF NEW YORK, N. Y.

IMPROVEMENT IN BOLT AND NUT-THREADING MACHINES.

Specification forming part of Letters Patent No. 121,743, dated December 12, 1871.

*To all whom it may concern:*

Be it known that we, FRANK S. ALLEN and CHARLES F. RITCHEL, of the city, county, and State of New York, have invented an Improved Bolt-Heading and Nut-Tapping Machine; and we do hereby declare that the following is a full, clear, and exact description thereof, which will enable others skilled in the art to make and use the same, reference being had to the accompanying drawing forming a part of this specification.

Our invention relates to tapping nuts, and will be hereinafter fully described and then clearly pointed out in the claim.

Figure 1 is a longitudinal sectional elevation of our improved machine taken on the line $a\,a$ of Fig. 2. Fig. 2 is a cross-section on the line $x\,x$ of Fig. 1. Fig. 3 is a plan view. Fig. 4 is a section on the line $y\,y$ of Fig. 1. Fig. 5 is a transverse section of the aforesaid improved bolt-cutter taken on the line $z\,z$ of Fig. 6, and Fig. 6 is a longitudinal section of the same taken on the line $w\,w$ of Fig. 5.

A and B represent two series of crank-shafts, mounted on opposite sides of the driving-pulley C, by which they are actuated, in supports D, which cranks have the peculiarity of allowing two or more of the shafts to which they belong to be arranged very close together, in gangs, without interfering with each other in turning—all being turned in unison—which is due to the oblique arrangement of the parts connecting the shafts and the wrists. The said wrists of each gang, being connected to a plate, E, at the same distances apart that the shafts F are, are all turned simultaneously by said plate being moved in an orbit, which is done by the wheels G, to which said plate is connected by a wrist, H, on each. There are two sets of these wheels, one for each plate E, the like wheels of each set being mounted on a shaft, I, mounted in housings K, and each set gears with the driving-shaft L, also mounted in the housings K, by a pinion, M. The said pinion also turns the screw-shafts N and O, extending each way from the driving-gear to the end of the frame, and having screw-threaded parts T at said ends, which work in nuts Q on sliding frames R, which are mounted on the frame so that they can slide back and forth, being moved by the screw-threaded shafts either way, according to the way the said shafts are turned. The crank-shafts are provided with screw-taps S or bolt-cutters T at the ends, which project beyond the supports D, and in front of these is a nut or bolt-holding plate, U, in each of the sliding frames R, having twice as many holes and sockets V as there are taps or screw-cutters, arranged in two sections, so that when those of one section are at the cutters and the nuts or bolts in them are being acted on, those of the other section are so far aside as to allow of their being discharged of the finished nuts or bolts, and being charged with another batch, ready to be presented in turn to the taps or cutters, which is done by sliding the plate endwise in the guides M of the frames R, in which they are fitted. The sockets or cavities of the plates V are on the side opposite to the cutters, with holes extending through the plates to the same side for the bolts, or for the taps when nuts are being cut. The bolts are passed through these holes, and the heads put in the sockets from behind the plates, and the nuts are put in from the same side, so that when they are carried in front of the tools they are confined in the sockets by the frames R. The pinions M being made as small as practicable to reduce the motion of the crank-shafts, and the wheels G correspondingly large, the latter could not be geared with the pinion and have their sides from which the wrists connecting the plates E project in the same plane, which is desirable, because the said wheels would interfere with each other. We therefore narrow down the faces at $a$ and the outer portions for some distance from said faces, and arrange them in the order shown in the drawing, which also prevents their interfering with the wheels J on the screw-shafts O N. The cutter-heads which we use consist of a hollow cylinder, X, with a socket, Y, at one end, for fitting on the end of a mandrel or shaft, and clearing-slots Z for the escape of the chips; and on the other end of the cylinder a solid screw-cutting die, Z', is bolted. This provides ample space behind the die and in front of the end of the shaft or mandrel for the bolt to pass through the die, while it is a strong and reliable support for the die. These heads will be made long enough for the longest bolt to be cut, so that the dies Z', which are made detachable for being changed readily for using different sizes, have only to be changed when it is desired to cut bolts of different sizes. The driving-pulley C and the feed-screws will be turned in one direction for acting upon the bolts or nuts at one end, at the same time withdrawing from those at the other end, and those in the other direction reversing the operation, a new batch being supplied at one end while those at the other are cut.

It will be seen that by our arrangement of two sets of cutters or taps, two movable frames and holders, and the screws for operating the sliding frames, the capacity of the machine is doubled as compared with a machine having cutters or taps at one end only; and it will also be observed that the number of tools that may be used in each gang is almost unlimited; hence, by the employment of these serial crank mechanisms and the duplicate gangs of tools we have a machine calculated to greatly reduce the cost of this kind of work.

It is immaterial whether we use taps with one gang of shafts and cutters with the other, or all taps or cutters; but, for providing threaded nuts to match the bolts, we prefer to have the machine adapted for cutting bolts at one end and nuts at the other.

Having thus described our invention, we claim as new and desire to secure by Letters Patent—

1. The multiple crank-shafts A B, plates E E, wrist-gears G H, pinions M M, and driving-shaft L, combined, as described, for the purpose of operating the two sets of bolt or nut-threaders S T alternately, as described.

2. The transversely-sliding and multiple blank-holders U W, containing receptacles for two or more feeds, arranged and applied in a bolt and nut-threader, as and for the purpose set forth.

3. In bolt and nut-threaders, a sliding blank-holder, open at the rear to receive the blanks, and combined with a guide-frame, R, recessed sufficiently to receive each tool, but forming a rigid back for the blank, as described.

4. A cutter-head, X, having socket Y at the rear, clearing slots Z in the middle, and cutting-dies Z' in front, all constructed and arranged as set forth.

The above specification of our invention signed by us this 12th day of September, 1871.

FRANK S. ALLEN.
CHARLES F. RITCHEL.

Witnesses:
GEO. W. MABEE,
WM. H. C. SMITH.

(14)